United States Patent
Katougi

(10) Patent No.: US 12,099,732 B2
(45) Date of Patent: Sep. 24, 2024

(54) MEMORY SYSTEM AND INFORMATION PROCESSING SYSTEM

(71) Applicant: Kioxia Corporation, Tokyo (JP)

(72) Inventor: Hiroshi Katougi, Isehara Kanagawa (JP)

(73) Assignee: Kioxia Corporation, Tokyo (JP)

( * ) Notice: Subject to any disclaimer, the term of this patent is extended or adjusted under 35 U.S.C. 154(b) by 41 days.

(21) Appl. No.: 18/171,263

(22) Filed: Feb. 17, 2023

(65) Prior Publication Data
US 2024/0053909 A1    Feb. 15, 2024

(30) Foreign Application Priority Data

Aug. 9, 2022  (JP) ................. 2022-126726

(51) Int. Cl.
*G06F 3/00* (2006.01)
*G06F 3/06* (2006.01)

(52) U.S. Cl.
CPC .......... *G06F 3/0634* (2013.01); *G06F 3/0625* (2013.01); *G06F 3/0656* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 9,639,373 | B2 | 5/2017 | Watanabe |
| 10,459,855 | B2 | 10/2019 | Chung et al. |
| 2020/0090763 | A1 | 3/2020 | Tokutomi et al. |
| 2022/0083270 | A1 | 3/2022 | Suzuki |
| 2023/0088028 | A1* | 3/2023 | Nanzawa ............... G06F 3/0679 711/154 |

FOREIGN PATENT DOCUMENTS

| | | |
|---|---|---|
| JP | 2006-340034 A | 12/2006 |
| JP | 2016-062172 A | 4/2016 |
| JP | 2020-047318 A | 3/2020 |
| JP | 2022-050018 A | 3/2022 |
| WO | 2010084590 A1 | 7/2010 |

* cited by examiner

*Primary Examiner* — Midys Rojas
(74) *Attorney, Agent, or Firm* — Kim & Stewart LLP

(57) ABSTRACT

A memory system is connectable to a host device, and includes a nonvolatile memory, a signal line connected to the nonvolatile memory, and a memory controller. The memory controller is connected to the signal line, and repeatedly performs de-assertion and assertion of the signal line at a first frequency while transmitting or receiving data to or from the nonvolatile memory. The memory controller, in response to receiving a first command from the host, repeatedly performs the de-assertion and the assertion of the signal line at a second frequency lower than the first frequency while transmitting or receiving the data to or from the nonvolatile memory.

20 Claims, 4 Drawing Sheets

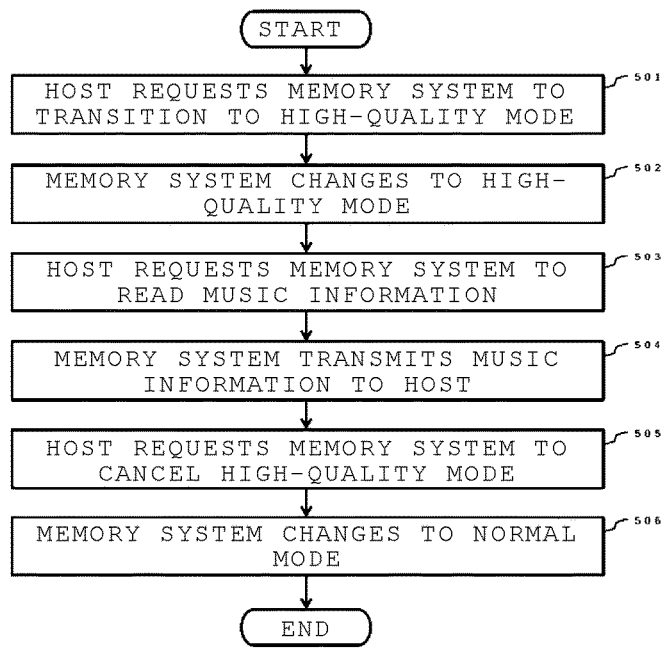
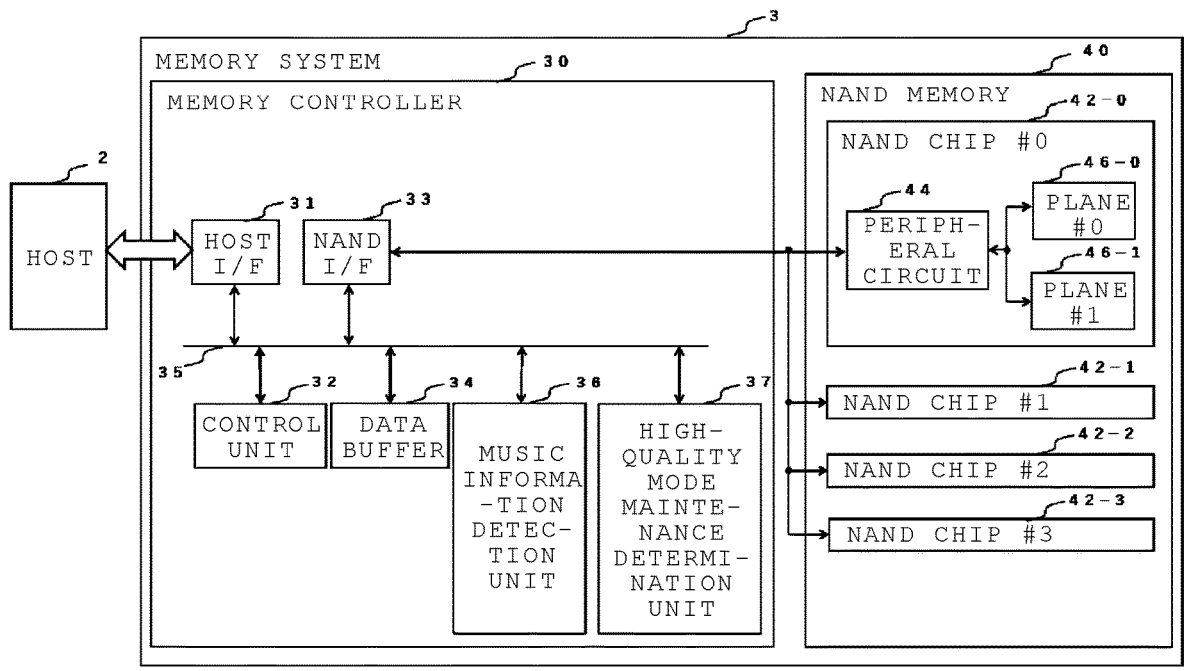

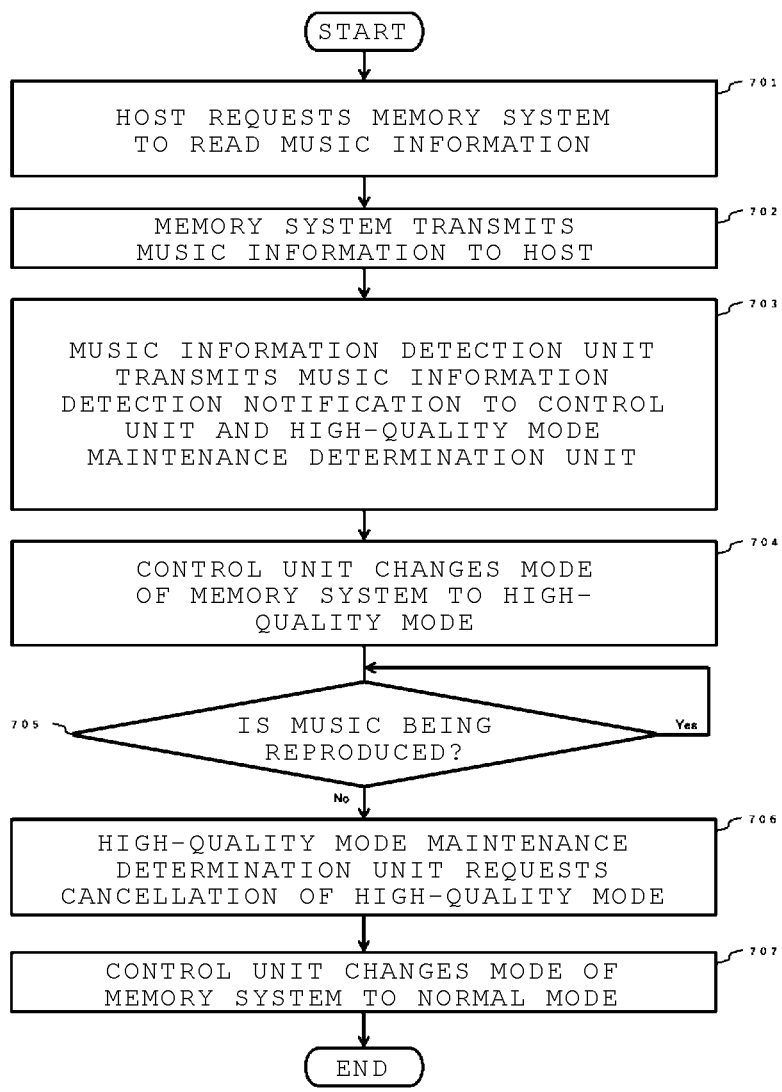

MEMORY SYSTEM AND INFORMATION PROCESSING SYSTEM

CROSS-REFERENCE TO RELATED APPLICATION

This application is based upon and claims the benefit of priority from Japanese Patent Application No. 2022-126726, filed Aug. 9, 2022, the entire contents of which are incorporated herein by reference.

FIELD

Embodiments described herein relate generally to a memory system and an information processing system.

BACKGROUND

A memory system including a NAND type flash memory (hereinafter simply referred to as a NAND memory) as an example of a nonvolatile memory and a memory controller configured to control the NAND memory, is known. An example of such a memory system is a solid state drive (hereinafter referred to as an SSD).

Further, an audio device configured to read music information stored in a hard disk, a memory card, and the like, and to reproduce the read music information, is known.

DESCRIPTION OF THE DRAWINGS

FIG. 5 is a flowchart showing an example of mode transition of the memory system according to the first embodiment.

FIG. 6 is a block diagram showing a configuration example of a memory system according to a second embodiment.

FIG. 7 is a flowchart showing an example of mode transition of the memory system according to the second embodiment.

DETAILED DESCRIPTION

Embodiments provide a memory system configured to enable an audio device of a connection destination to reproduce music information with higher quality.

In general, according to one embodiment, a memory system is connectable to a host device, and includes a nonvolatile memory, a signal line connected to the nonvolatile memory, and a memory controller. The memory controller is connected to the signal line, and repeatedly performs de-assertion and assertion of the signal line at a first frequency while transmitting or receiving data to or from the nonvolatile memory. The memory controller, in response to receiving a first command from the host, repeatedly performs the de-assertion and the assertion of the signal line at a second frequency lower than the first frequency while transmitting or receiving the data to or from the nonvolatile memory.

Hereinafter, embodiments of implementing the present disclosure will be described with reference to the drawings.

First Embodiment

Figure 1:
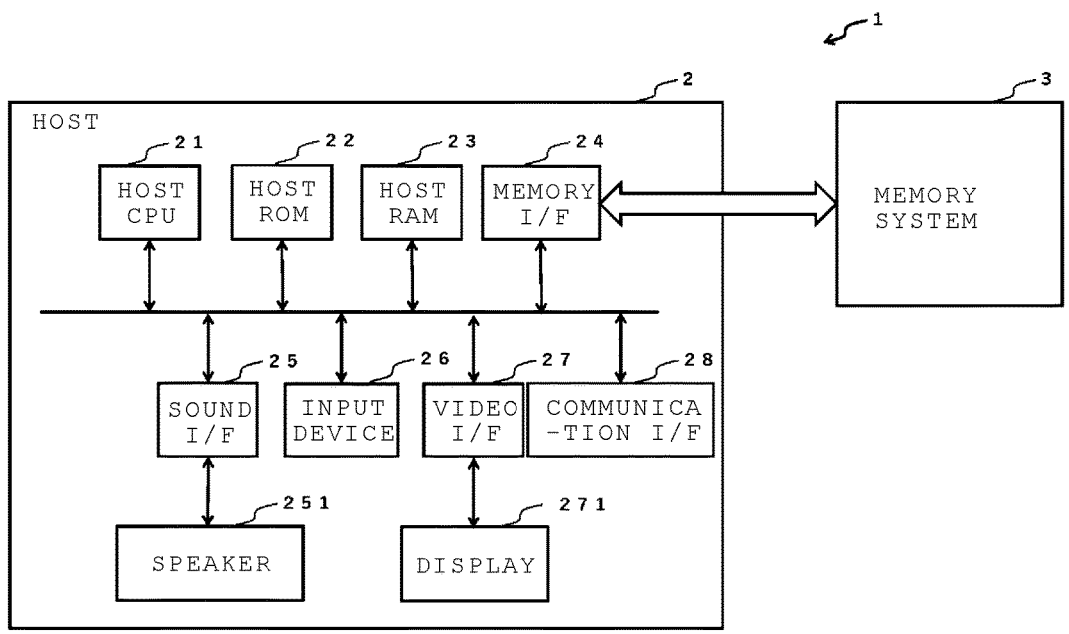
FIG. 1 is a block diagram showing a configuration example of an information processing system including a memory system according to a first embodiment.

FIG. 1 is a block diagram showing a configuration example of an information processing system including a memory system according to a first embodiment. An information processing system 1 includes a host 2 and a memory system 3.

The host 2 may be, for example, an information processing device such as a personal computer or an audio device, or may be a mobile terminal such as a tablet computer or a smart phone. The memory system 3 is connected to the host 2 with a communication line interposed therebetween, and functions as an external storage device of the host 2.

The host 2 includes a host CPU 21, a host ROM 22, a host RAM 23, a memory interface (a memory I/F) 24, a sound interface (a sound I/F) 25, a speaker 251, an input device 26, a video I/F 27, a display 271, and a communication I/F 28. The host CPU 21, the host ROM 22, the host RAM 23, the memory I/F 24, the sound I/F 25, the input device 26, the video I/F 27, and the communication I/F 28 are connected to each other by a bus.

The host CPU 21 is a central processing unit (CPU), and comprehensively controls the host 2. The host ROM 22 is a read only memory (ROM), and records programs such as a boot program, a data update program, and a specific information acquisition program. Further, the host RAM 23 is a random access memory (RAM) and is used as a work area of the host CPU 21. That is, the host CPU 21 comprehensively controls the host 2 by executing various programs recorded in the host ROM 22 while using the host RAM 23 as a work area.

The memory I/F 24 controls reading and writing of data with respect to the memory system 3 according to the control of the host CPU 21, and transmits a read request, a write request, and the like to the memory system 3. Here, the write request specifies write data, a logical address (in particular, a starting logical address), and a size of the write data. The write request is a command of requesting the memory system 3 to write the write data to a storage area of a NAND memory 40 corresponding to the starting logical address and the size. In this embodiment, the data written to the NAND memory 40 by the write request from the host 2 is referred to as user data.

The read request specifies a logical address (in particular, a starting logical address) and a size of data to be read. The read request is a command of requesting the memory system 3 to read data from the storage area of the NAND memory 40 corresponding to the starting logical address and the size.

Examples of the write data specified in the write request include music information, and section information of the music information, which becomes digest information. The music information is also referred to as sound data. Further, the section information of the music information, which becomes the digest information, may be associated with the music information.

The sound I/F 25 is connected to the speaker 251 for sound output. The speaker 251 outputs a sound obtained by D/A converting a predetermined sound signal received from the sound I/F 25. Additionally, for example, the sound I/F 25 may be connected to two speakers 251 for the right ear and left ear of a user.

Examples of the input device 26 include a remote control, a keyboard, a touch panel, and the like having a plurality of keys configured to input characters, numerical values, various instructions, and the like. The input device 26 may be implemented by any one element of the remote control, the keyboard, and the touch panel, or may be implemented by a plurality of elements.

The video I/F 27 is connected to the display 271. Specifically, the video I/F 27 is formed of, for example, a graphic controller configured to control the entire display 271, a buffer memory such as a video RAM (VRAM) configured to temporarily record image information capable of being displayed immediately, and a control IC configured to control the display 271 based on image data output from the graphic controller.

The display 271 displays an icon, a cursor, a menu, a window, or various data such as characters and images. Characters, image information, and reproduction time related to the above-described music information may be drawn on the display 271. As the display 271, for example, a liquid crystal display or the like may be used.

The communication I/F 28 is wirelessly connected to a network, and functions as an interface with the network. The communication I/F 28 is further connected to a communication network such as the Internet wirelessly or by wire, and functions as an interface between this communication network and the host CPU 21. Then, desired music information can be retrieved from a server on the Internet.

The host CPU 21 can save the music information by transmitting the write request to the memory system 3. In addition, the music information can be read from the memory system 3 by transmitting the read request to the memory system 3.

The host CPU 21 executes a predetermined music reproduction program recorded in the host ROM 22 or the like, and controls each element in the host 2. That is, the host 2 can reproduce the music information read from the memory system 3 by executing the music reproduction program recorded in the host ROM 22.

Figure 2:
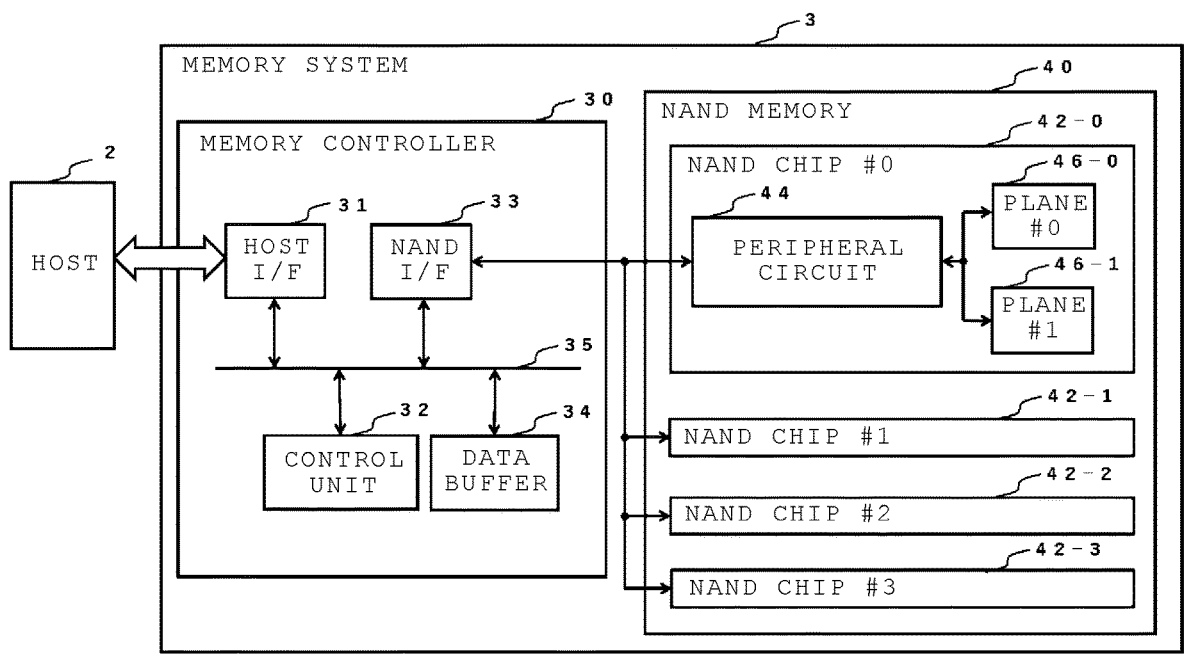
FIG. 2 is a block diagram showing a configuration example of the memory system according to the first embodiment.

FIG. 2 is a block diagram showing a configuration example of the memory system according to the first embodiment.

The memory system 3 may be a memory card in which the memory controller 30 and the NAND memory 40 are formed as one package, or may be an SSD.

The memory controller 30 controls writing of data to the NAND memory 40 according to the write request from the host 2. In this embodiment, a request is, for example, an instruction or a command. Further, the memory controller 30 controls reading of data from the NAND memory 40 according to the read request from the host 2. The memory controller is also referred to as a controller.

The NAND memory 40 is an example of a nonvolatile memory. The nonvolatile memory is not limited to a NAND memory, and may be a NOR type flash memory or other types of nonvolatile memory. The nonvolatile memory may be a memory having a two-dimensional structure or a memory having a three-dimensional structure.

The NAND memory 40 includes a plurality of NAND chips. For example, the NAND memory 40 includes four NAND chips such as a NAND chip (0) 42-0, a NAND chip (1) 42-1, a NAND chip (2) 42-2, and a NAND chip (3) 42-3. The NAND chips 42-0 to 42-3 are collectively referred to as a NAND chip 42 when it is not necessary to distinguish between the respective NAND chips 42-0 to 42-3. Each NAND chip 42 includes a peripheral circuit 44 and a plurality of planes. For example, each NAND chip 42 includes two planes such as a plane (0) 46-0 and a plane (1) 46-1. The planes 46-0 and 46-1 are collectively referred to as a plane 46 when it is not necessary to distinguish between the respective planes 46-0 and 46-1.

The memory controller 30 includes a host interface (a host I/F) 31, a control unit 32, a data buffer 34, and a NAND interface (a NAND I/F) 33. The host I/F 31, the control unit 32, the data buffer 34, and the NAND I/F 33 are connected to each other by an internal bus 35.

The host I/F 31 executes a process in accordance with an interface standard with the host 2, and outputs a request, user data, and the like received from the host 2 to the internal bus 35. The host I/F 31 also transmits, to the host 2, user data read from the NAND memory 40, a response from the control unit 32, and the like. In this embodiment, data written to the NAND memory 40 by the write request from the host 2 is referred to as user data.

The control unit 32 comprehensively controls each component of the memory system 3. The control unit 32 may be implemented by hardware, or may be implemented by allowing a processor such as a CPU to execute firmware. In the latter case, for example, when the memory system 3 receives power, a processor reads a firmware (a control program) stored in a ROM (not shown) into a RAM (not shown) in the data buffer 34 or the control unit 32 to execute a predetermined process, thereby implementing the process of the control unit 32. Here, the processor is also referred to as a core or a processor core.

When the control unit 32 receives a request from the host 2 via the host I/F 31, the same performs a control operation according to the instruction. For example, according to the request from the host 2, the control unit 32 encodes data using an encoding circuit to generate a codeword having data and a redundant part (parity), and instructs the NAND I/F 33 to write the codeword to the NAND memory 40. In addition, according to the request from the host 2, the control unit 32 uses a decoding circuit to acquire a codeword, which is data read from the NAND memory 40, via the NAND I/F 33, and decodes the acquired codeword.

Additionally, upon receiving a write request from the host 2, the control unit 32 determines a storage area (a memory area) on the NAND memory 40 with respect to user data specified by the write request. That is, the control unit 32 manages a write destination of the user data. Correspondence between a logical address of user data received from the host 2 and a physical address indicating a storage area on the NAND memory 40 having the user data stored therein is stored as an address conversion table. The control unit 32 also manages and stores the address conversion table as management information, and also stores information managed the memory system 3 other than the address conversion table in the management information.

Additionally, upon receiving a read request from the host 2, the control unit 32 converts a logical address specified by the read request into a physical address using the address conversion table, and instructs the NAND I/F 33 to read from the physical address.

The data buffer 34 temporarily stores user data received from the host 2 by the memory controller 30 until the user data is stored in the NAND memory 40. The data buffer 34 also temporarily stores user data read from the NAND memory 40 until the user data is transmitted to the host 2. The data buffer 34 is formed of a general-purpose memory such as a static random access memory (SRAM) or a dynamic random access memory (DRAM). Further, the data buffer 34 may be mounted in the memory controller 30 or may be mounted outside the memory controller 30 independently of the memory controller 30.

The NAND I/F 33 controls the NAND memory 40. The NAND I/F 33 erases data stored in a nonvolatile memory according to the control of the control unit 32 or the like.

The memory system 3 has a plurality of operating states including two states such as a normal power mode in which normal operation can be performed, and a sleep mode having power consumption lower than that of the normal power mode, and operates in either mode. When the operating state of the memory system 3 is the normal power mode, upon receiving a transition instruction to the sleep mode from an external device such as the host 2, the control unit 32 causes the operating state of the memory system 3 to transition to the sleep mode on the premise that a predetermined condition is satisfied. Further, when the operating state of the memory system 3 is the normal power mode, upon lapse of a predetermined time elapses without receiving any instruction from the external device such as the host 2, the control unit 32 may cause the operating state of the memory system 3 to transition to the sleep mode. When the operating state of the memory system 3 is the sleep mode, upon receiving a transition instruction to the normal power mode from the external device such as the host 2, the control unit 32 causes the operating state of the memory system 3 to transition to the normal power mode on the premise that a predetermined condition is satisfied. When the operating state of the memory system 3 is the sleep mode, for example, the power consumption of the memory system 3 becomes smaller than that of the normal power mode by allowing the control unit 32 to cut off power supply to the NAND memory 40 and a circuit provided in the control unit 32.

In the memory system according to the first embodiment, when a read request, a write request, a data erase request, and a data delete request such as a trim command are received from the host 2, or when the memory controller 30 executes garbage collection (compaction), refresh, wear leveling, patrol read, and the like in the background, the memory controller 30 accesses the NAND memory 40.

The garbage collection is also referred to as compaction. The NAND memory 40 differs in data erasing unit and data read/write unit. Accordingly, when the NAND memory 40 is rewritten, blocks are fragmented by invalid data, and when the number of fragmented blocks increases, the number of available blocks decreases. The garbage collection is a process of increasing the number of available blocks, for example, a process of collecting valid data from a plurality of active blocks including valid data and invalid data, rewriting the collected valid data to another block, and allocating a free block.

The active block indicates a block in which the valid data is recorded. The free block indicates a block in which the valid data is not recorded. The free block can be reused as an erased block after being erased. In this embodiment, the free block includes both a pre-erased block in which the valid data has not been recorded and an erased block. The valid data is data associated with a logical address, and the invalid data is data not associated with a logical address. The erased block becomes the active block when data is written thereto.

The refresh is a process of rewriting detected data in a block to another block when deterioration of the data in the block, such as an increase in the number of correction bits in an error correction process, is detected.

The wear leveling is a process of leveling the number of times of rewriting a block in the NAND memory 40 by, for example, replacing data stored in a block having the large number of times of rewriting and erasing with data stored in a block having the small number of times of rewriting and erasing.

The patrol read is, for example, a process of reading data stored in the NAND memory 40 by a predetermined unit and testing the read data based on an error correction result in order to detect a block increased errors. In this test process, for example, the number of error bits of the read data is compared with a threshold, and data having the number of error bits exceeding the threshold is defined as a target to be refreshed.

Figure 3:
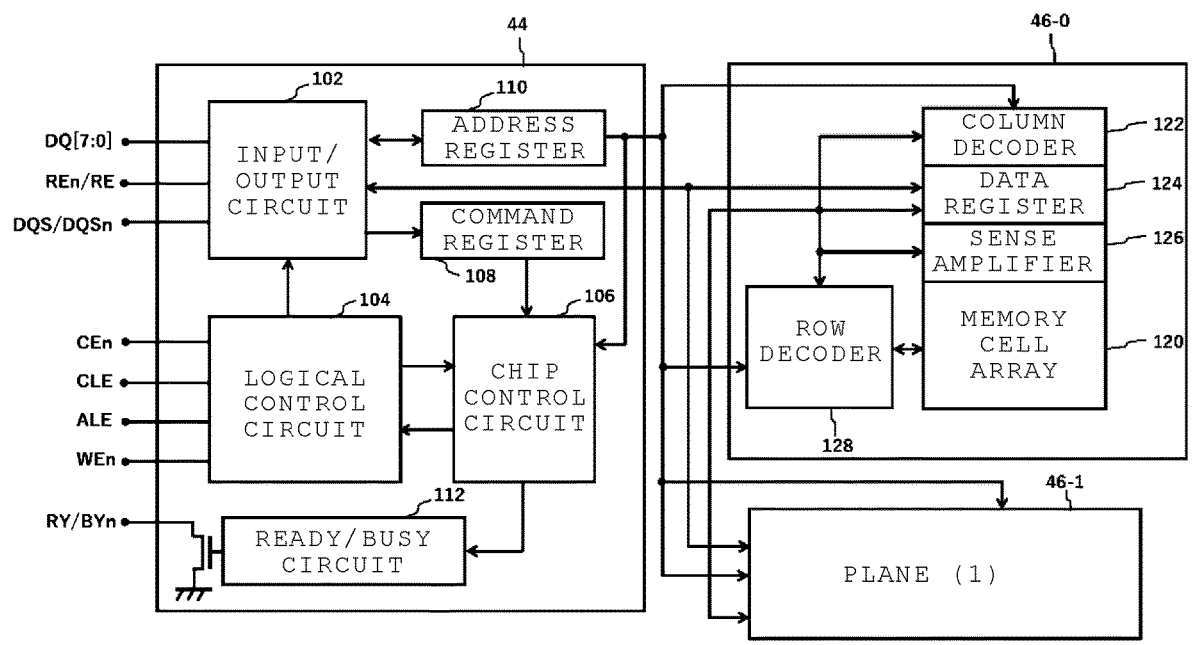
FIG. 3 is a block diagram showing an example of a configuration of each NAND chip in the memory system according to the first embodiment.

FIG. 3 is a block diagram showing an example of a configuration of each NAND chip 42 in the memory system according to the first embodiment. The peripheral circuit 44 of each NAND chip 42 includes an input/output circuit 102, a logical control circuit 104, a chip control circuit 106, a command register 108, an address register 110, and a ready/busy circuit 112. Each plane 46 of each NAND chip 42 includes a memory cell array 120, a column decoder 122, a data register 124, a sense amplifier 126, and a row decoder 128.

Each channel CH connecting each NAND chip 42 to the NAND I/F 33 includes an I/O signal line DQ[7:0] configured to transfer an I/O signal and a control signal line configured to transfer a control signal. The I/O signal includes a command, an address, and data. The I/O signal line DQ[7:0] is connected to the input/output circuit 102.

The control signal line includes a chip enable signal line CEn, a command latch enable signal line CLE, an address latch enable signal line ALE, a write enable signal line WEn, a read enable signal line REn/RE, a data strobe signal line DQS/DQSn, and a ready/busy signal line RY/BYn. Each control signal line transfers a one-bit control signal. The I/O signal line DQ[7:0] transfers a command, an address, and data. The command latch enable signal line CLE transfers a command latch enable signal indicating that a signal sent using the I/O signal line DQ[7:0] is a command. The address latch enable signal line ALE transfers an address latch enable signal indicating that a signal sent using the I/O signal line DQ[7:0] is an address. The chip enable signal line CEn, the command latch enable signal line CLE, the address latch enable signal line ALE, and the write enable signal line WEn are connected to the logical control circuit 104. The read enable signal line REn/RE and the data strobe signal line DQS/DQSn are connected to the input/output circuit 102. The ready/busy signal line RY/BYn is connected to the ready/busy circuit 112.

A signal transferred through a signal line includes a high active signal (a positive logical signal) configured to be active (valid) at a high level and a low active signal (a negative logical signal) configured to be active at a low level. Normally, the negative logical signal is expressed by adding an overline or an upper line to a symbol representing a signal, but in this specification, the same is expressed by adding n after the symbol for convenience of notation. For example, the chip enable signal line CEn transfers a negative logical signal configured to become a low level when the NAND chip 42 is enabled and to become a high level when the same is disabled. Further, a signal line is said to be "asserted" when a signal is at a valid level, and a signal line is said to be "de-asserted" when a signal is at an invalid level. When a signal line configured to transfer a positive logical signal is asserted, a signal level becomes a high level. When a signal line configured to transfer a negative logical signal is asserted, a signal level becomes a low level.

Normally, the signal line transfers either the positive logical signal or the negative logical signal, but the read enable signal line REn/RE and the data strobe signal line DQS/DQSn transfer a complementary signal of both the negative and positive logical signals.

The I/O signal line DQ[7:0] is an 8-bit signal line configured to transfer data, addresses, and various commands. The NAND I/F 33 asserts the command latch enable signal line CLE when transmitting a command using the I/O signal line DQ[7:0]. The NAND I/F 33 asserts the address latch enable signal line ALE when transmitting an address using the I/O signal line DQ[7:0]. The NAND I/F 33 transmits the command and the address using the I/O signal line DQ[7:0] in synchronization with the rise of the write enable signal line WEn.

The NAND I/F 33 transmits write data using the I/O signal line DQ[7:0] in synchronization with both edges of the data strobe signal line DQS/DQSn. The peripheral circuit 44 transmits read data using the I/O signal line DQ[7:0] in synchronization with both edges of the data strobe signal line DQS/DQSn.

The chip control circuit 106 is a circuit configured to perform state transition based on various control signals received via the logical control circuit 104. The chip control circuit 106 controls the operation of each NAND chip 42. The ready/busy circuit 112 performs state transition of the ready/busy signal line RY/BYn between a ready state (RY) and a busy state (BY) under the control of the chip control circuit 106.

The input/output circuit 102 is a buffer circuit configured to transmit and receive an I/O signal to and from the NAND I/F 33. A command, an address, and data latched by the input/output circuit 102 based on an instruction from the logical control circuit 104 are respectively distributed to the command register 108, the address register 110, and the data register 124, and respectively stored therein.

The address stored in the address register 110 includes a chip number, a row address, and a column address. The chip number is identification information for distinguishing between the respective NAND chips 42. The chip number is supplied to the chip control circuit 106, the row address is supplied to the row decoder 128, and the column address is supplied to the column decoder 122. The address may also include a plane number for distinguishing between planes. When the address does not include the plane number, an address space may be distinguished for each plane so that the address can identify the plane. Similarly, the address does not necessarily have to include the chip number. In such a case, an address space may be distinguished for each chip so that the address can identify the chip.

The logical control circuit 104 receives input of a control signal. Based on the received control signal, the logical control circuit 104 executes distribution of a register of a storage destination of the I/O signal received by the input/output circuit 102. The logical control circuit 104 transfers the received control signal to the chip control circuit 106.

The memory cell array 120 of each plane 46 of each NAND chip 42 includes a plurality of blocks. Each block includes a plurality of pages. Each page includes a plurality of memory cells connected to the same word line. The block is a unit of data erasing operation of erasing data from the NAND memory 40 (also referred to as block erasing). The page is a unit of data write operation and data read operation.

The column decoder 122 and the row decoder 128 specify a memory cell of the memory cell array 120 according to the column address and the row address. During the write operation, data in the data register 124 is written to the memory cell specified by the column decoder 122 and the row decoder 128. During the read operation, the sense amplifier reads the data from the memory cell specified by the column decoder 122 and the row decoder 128. The read data is written to the data register 124.

Next, an overview of a toggle interface between the NAND I/F 33 of the memory controller 30 and (the peripheral circuit 44 of) the NAND memory 40 will be described with an example of a read operation for the NAND memory 40.

Figure 4:
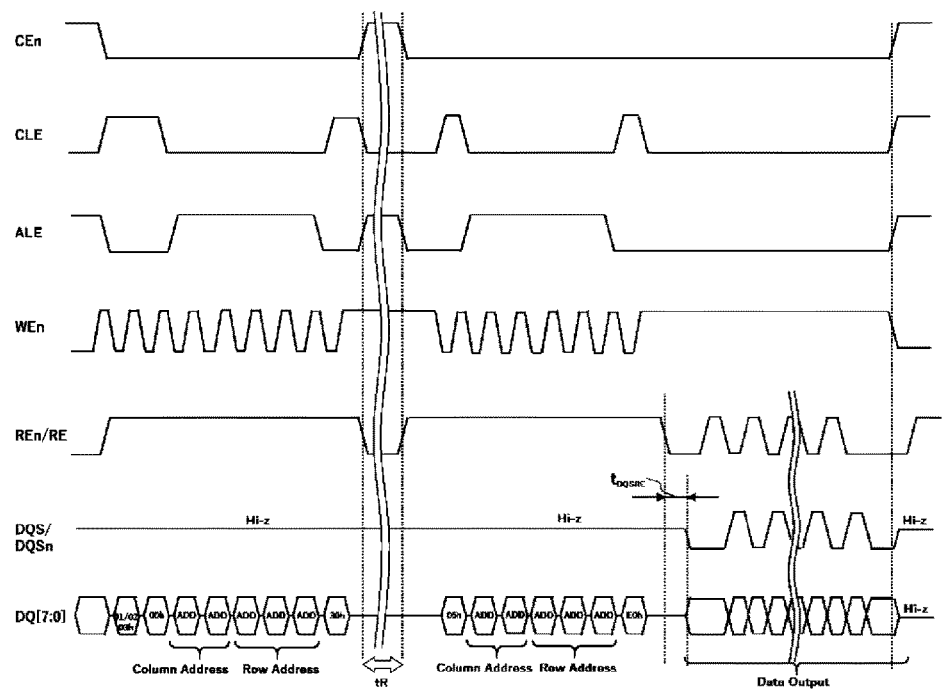
FIG. 4 is an example of a signal waveform during a read operation for a NAND memory in the memory system according to the first embodiment.

FIG. 4 is an example of a signal waveform during the read operation for the NAND memory in the memory system according to the first embodiment. The read operation consists of a data output preparation operation of reading data from a memory cell specified by an address following a read data command and writing the read data to the data register 124 in the NAND chip 42, and a data output operation of transferring the data in the data register 124 to the memory controller 30 by the input/output circuit 102.

In the initial state, the chip enable signal line CEn is in a de-asserted state, the data strobe signal line DQS/DQSn is in a high impedance (Hi-z) state, and the states of other signal lines are irrelevant.

The NAND I/F 33 asserts the chip enable signal line CEn and the command latch enable signal line CLE, de-asserts the address latch enable signal line ALE and the read enable signal line REn/RE, and maintains the high impedance state of the data strobe signal line DQS/DQSn.

The NAND I/F 33 starts periodic assertion/de-assertion of the write enable signal line WEn. That is, the level of the write enable signal line WEn becomes a low level and a high level periodically. The NAND I/F 33 sequentially transfers commands 01h/02h/03h and 00h indicating the read data command to the NAND chip 42 using the I/O signal line DQ[7:0] in synchronization with the rise (de-assertion) of the write enable signal line WEn. The input/output circuit 102 of the NAND chip 42 sequentially latches the commands 01h/02h/03h and 00h sequentially input using the I/O signal line DQ[7:0] in synchronization with the rise of the write enable signal line WEn.

The command 01h/02h/03h indicates a lower page, a middle page, or an upper page. The command 00h indicates that the read address will follow.

After transferring the command ooh, the NAND I/F 33 de-asserts the command latch enable signal line CLE and asserts the address latch enable signal line ALE.

The NAND I/F 33 sequentially transfers a column address ADD having two cycles and a row address ADD having three cycles to the NAND chip 42 using the I/O signal line DQ[7:0] in synchronization with the rise of the write enable signal line WEn. The input/output circuit 102 sequentially latches the column address and the row address sequentially input using the I/O signal line DQ[7:0] in synchronization with the rise of the write enable signal line WEn.

After transferring the row address ADD, the NAND I/F 33 asserts the command latch enable signal line CLE and de-asserts the address latch enable signal line ALE.

The NAND I/F 33 transfers, to the NAND chip 42, a command 30h of giving an instruction to read data from a memory cell array of the last input address using the I/O signal line DQ[7:0] in synchronization with the rise of the write enable signal line WEn. The input/output circuit 102 latches the command 30h input using the I/O signal line DQ[7:0] in synchronization with the rise of the write enable signal line WEn.

When the NAND chip 42 receives the command 30h, it starts reading the data from the memory cell array. The time required to read the data is time tR in FIG. 4.

The NAND I/F 33 maintains the state of each signal line for the time tR after transferring the command 30h.

After the lapse of the time tR, the NAND I/F 32 asserts the command latch enable signal line CLE, and maintains the de-asserted state of the address latch enable signal line ALE.

The NAND I/F 33 starts the periodic assertion/de-assertion of the write enable signal line WEn. The NAND I/F 33 transfers a command 05h indicating the start of a data output command to the NAND chip 42 using the I/O signal line DQ[7:0] in synchronization with the rise (de-assertion) of the write enable signal line WEn. The input/output circuit 102 of the NAND chip 42 latches the command 05h input using the I/O signal line DQ[7:0] in synchronization with the rise of the write enable signal line WEn.

After transferring the command 05h thereto, the NAND I/F 33 de-asserts the command latch enable signal line CLE and asserts the address latch enable signal line ALE.

The NAND I/F 33 sequentially transfers, to the NAND chip 42, a column address ADD having two cycles and a row address ADD having three cycles using the I/O signal line DQ[7:0] in synchronization with the rise of the write enable signal line WEn. The input/output circuit 102 sequentially latches the column address and the row address sequentially input using the I/O signal line DQ[7:0] in synchronization with the rise of the write enable signal line WEn.

After transferring the row address ADD thereto, the NAND I/F 33 de-asserts the address latch enable signal line ALE and asserts the CLE.

The NAND I/F 33 transfers, to the NAND chip 42, a command E0h giving an instruction to start a data output operation using the I/O signal line DQ[7:0] in synchronization with the rise of the write enable signal line WEn. The input/output circuit 102 of the NAND chip 42 latches the command E0h input using the I/O signal line DQ[7:0] in synchronization with the rise of the write enable signal line WEn. The input/output circuit 102 latches the command E0h input using the I/O signal line DQ[7:0] in synchronization with the rise of the write enable signal line WEn.

Upon receiving the command E0h, the NAND chip 42 starts the data output operation.

After that, the NAND I/F 33 de-asserts the command latch enable signal line CLE, and stops the periodic assertion/de-assertion of the write enable signal line WEn by maintaining the de-asserted state of the write enable signal line WEn.

The transfer direction of the I/O signal line DQ[7:0] is bidirectional. During the above-described command transfer, the transmission direction of the I/O signal line DQ[7:0] is the direction from the memory controller 30 (the NAND I/F 33) to the NAND chip 42 (the input/output circuit 102). The NAND I/F 33 drives the I/O signal line DQ[7:0] to transfer a command, and the input/output circuit 102 receives the command.

The NAND I/F 33 switches the transmission direction of the I/O signal line DQ[7:0] to the direction from the NAND chip 42 to the memory controller 30 after transferring the command E0h. The input/output circuit 102 switches the transmission direction of the I/O signal line DQ[7:0] to the direction from the NAND chip 42 to the memory controller 30 after receiving the command E0h. After that, the input/output circuit 102 can drive the I/O signal line DQ[7:0] to transfer data, and the NAND I/F 33 can receive the data.

When the switching of the transmission direction of the I/O signal line DQ[7:0] is completed, the NAND I/F 33 starts periodic assertion/de-assertion of the read enable signal line REn/RE. A first period is longer than second and subsequent periods. The input/output circuit 102 starts periodic assertion/de-assertion of the data strobe signal line DQS/DQSn in conjunction with the periodic assertion/de-assertion of the read enable signal line REn/RE (delayed by tDQSRE for a certain period of time), and transfers read data to the NAND I/F 33 using the I/O signal line DQ[7:0] in synchronization with the data strobe signal line DQS/DQSn. The NAND I/F 33 latches the read data input using the I/O signal line DQ[7:0] in synchronization with the data strobe signal line DQS/DQSn.

After the transfer of the read data is completed, the NAND I/F 33 stops the periodic assertion/de-assertion of the read enable signal line REn/RE. Accordingly, the periodic assertion/de-assertion of the data strobe signal line DQS/DQSn is also stopped. The NAND I/F 33 de-asserts the command latch enable signal line CLE.

In the toggle interface, since commands and data are transferred using the I/O signal line DQ, commands cannot be transferred during data transfer. In the same manner, data cannot be transferred during command transfer.

When a plurality of NAND chips are connected to each channel of the memory controller 30, a command cannot be transferred to NAND chips other than a NAND chip to which the data to be transferred is transferred among the plurality of NAND chips connected to the same channel.

As described above, the data strobe signal line DQS/DQSn and the I/O signal line DQ[7:0] are also repeatedly de-asserted/asserted in conjunction with the periodic assertion/de-assertion of the read enable signal line REn/RE.

When writing data to the NAND memory 40, the memory controller 10 transmits write data to the NAND memory 40 via the NAND I/F 33. In this case, the NAND I/F 33 starts the periodic de-assertion/assertion of the data strobe signal line DQS/DQSn. The NAND I/F 33 sequentially transfers the write data to the NAND chip 42 using the I/O signal line DQ[7:0] in synchronization with both rising and falling edges of the data strobe signal line DQS/DQSn.

That is, when the memory controller 30 writes data to the NAND memory 40 or reads data from the NAND memory 40, the de-assertion/assertion of the read enable signal line REn/RE, the data strobe signal line DQS/DQSn, and the I/O signal line DQ[7:0] is repeatedly performed. As the frequency of these signals increases, the possibility of generating high-frequency noise generated in the memory system 3 also increases.

Therefore, the memory system 3 operates in either a normal mode or a high-quality mode. When the memory system 3 operates in the high-quality mode, the NAND I/F 33 performs a control operation to repeatedly perform the de-assertion/assertion of the read enable signal line REn/RE at a frequency lower than that of the normal mode.

Specifically, when the memory controller 30 repeatedly performs the de-assertion/assertion of the read enable signal line REn/RE, in the normal mode, the NAND I/F 33 repeatedly performs the de-assertion/assertion of the read enable signal line REn/RE at a predetermined frequency, and in the high-quality mode, the NAND I/F 33 repeatedly performs the de-assertion/assertion of the read enable signal line REn/RE at a frequency lower than that of the normal mode. Here, the frequency indicates the number of times the read enable signal line REn/RE and the data strobe signal line DQS/DQSn are repeatedly de-asserted/asserted per second. The frequency may be a value based on the number of times the read enable signal line REn/RE and the data strobe signal line DQS/DQSn are repeatedly de-asserted/asserted during a predetermined time period, or may be a value based on the time from when the read enable signal line REn/RE and the data strobe signal line DQS/DQSn are de-asserted to when the same are de-asserted next.

The mode of the memory system 3 is managed by the memory controller 30, and information on the mode of the memory system 3 is stored in the management information or the like. Further, the memory controller 30 causes the memory system 3 to operate in the normal mode when the memory system 3 starts up.

Next, mode transition of the memory system 3 will be described. FIG. 5 is a flowchart showing an example of the mode transition of the memory system according to the first embodiment.

The host 2 requests the memory system 3 to transition to a high-quality mode (step S501). Specifically, the host CPU 21 transmits a command of requesting the memory system 3 to transition to the high-quality mode via the memory I/F 24.

The memory controller 30 changes the mode of the memory system 3 to the high-quality mode in response to the request from the host 2 for the memory system 3 to transition to the high-quality mode (step S502). Specifically, upon receiving the command of requesting the memory system 3 to transition to the high-quality mode via the host I/F 31, the control unit 32 changes mode information stored in the management information or the like to the high-quality mode and controls the NAND I/F 33 in the high-quality mode.

The host 2 requests the memory system 3 to read music information (step S503). Specifically, the host CPU 21 transmits a read request specifying a logical address to the memory system 3 via the memory I/F 24.

The memory controller 30 transmits the read music information to the host 2 in response to the read request of the music information from the host 2 (step S504). Specifically, upon receiving the read request specifying the logical address via the host I/F 31, the control unit 32 converts the logical address specified by the read request into a physical address using an address conversion table, and instructs the NAND I/F 33 to read the converted physical address. Then, the control unit 32 reads data from the NAND memory 40 via the NAND I/F 33 and transmits the read data to the host 2 via the host I/F 31.

The host 2 requests the memory system 3 to cancel the high-quality mode (step S505). Specifically, the host CPU 21 transmits a command of requesting cancellation of the high-quality mode to the memory system 3 via the memory I/F 24.

The memory controller 30 changes the mode of the memory system 3 to a normal mode in response to the request from the host 2 for the cancellation of the high-quality mode (step S506). Specifically, upon receiving the command of requesting the cancellation of the high-quality mode via the host I/F 31, the control unit 32 changes the mode information stored in the management information or the like to the normal mode, and controls the NAND I/F 33 in the normal mode.

As described above, according to the first embodiment, the memory system 3 operates in either the normal mode or the high-quality mode, and when the memory system 3 operates in the high-quality mode, the NAND I/F 33 performs a control operation to repeatedly perform the de-assertion/assertion of the read enable signal line REn/RE at a frequency lower than that of the normal mode. The memory system 3 also changes the mode of the memory system 3 in response to receiving a request from the host 2 to change the mode of the memory system 3.

The host 2 can reduce the possibility of generating high-frequency noise in the memory system 3 by reproducing the music information after changing the mode of the memory system 3 to the high-quality mode. Accordingly, it is possible to reduce the possibility of generating noise propagated from the memory system 3 to the host 2 via the host I/F 31 during reproduction of the music information.

Second Embodiment

A memory system according to a second embodiment will be described with reference to FIGS. 6 and 7. A difference between the second embodiment and the first embodiment is that the second embodiment includes a music information detection unit 36 and a high-quality mode maintenance determination unit 37. For each unit of the memory system according to the second embodiment, the same portion as each unit of the memory system according to the first embodiment is denoted by the same reference numeral. A detailed description of a portion where the memory system according to the second embodiment and the memory system according to the first embodiment overlap each other will be omitted.

FIG. 6 is a block diagram showing a configuration example of an information processing system including the memory system according to the second embodiment.

As shown in FIG. 6, the memory controller 30 according to the second embodiment further includes the music information detection unit 36 and the high-quality mode maintenance determination unit 37 in addition to the characteristics of the first embodiment. Each of the music information detection unit 36 and the high-quality mode maintenance determination unit 37 is connected to the internal bus 35.

The music information detection unit 36 periodically accesses the data buffer 34. When the host 2 requests to read music information, the control unit 32 uses an address conversion table to convert a logical address specified by the read request into a physical address, and instructs the NAND I/F 33 to read the converted physical address. The control unit 32 reads data from the NAND memory 40 via the NAND I/F 33, and temporarily stores the read data in the data buffer 34. Since the music information is temporarily stored in the data buffer 34, the music information detection unit 36 can determine whether the data buffer 34 stores the music information. When the music information detection unit 36 determines that the music information is stored in the data buffer 34, the music information detection unit 36 acquires reproduction time of the music information from the music information stored in the data buffer 34. The music information detection unit 36 issues a music information detection notification to the control unit 32 and the high-quality mode maintenance determination unit 37. The music information detection notification includes the reproduction time of the music information.

The music information detection unit 36 and the high-quality mode maintenance determination unit 37 may be implemented by hardware or by firmware. In the latter case, firmware of the music information detection unit 36 and the high-quality mode maintenance determination unit 37 is stored in a ROM (not shown) of the memory controller 30. The control unit 32 reads the firmware of the music information detection unit 36 and the high-quality mode maintenance determination unit 37 onto a RAM (not shown) and executes a predetermined process, thereby implementing the processes of the music information detection unit 36 and the high-quality mode maintenance determination unit 37.

The high-quality mode maintenance determination unit 37 starts counting time upon receiving the music information detection notification. The high-quality mode maintenance determination unit 37 receives the music information detection notification, and outputs a high-quality mode end notification to the control unit 32 when the reproduction time of the music information elapses.

Next, mode transition of the memory system 3 according to the second embodiment will be described. FIG. 7 is a flowchart showing an example of the mode transition of the memory system 3 according to the second embodiment.

The host 2 requests the memory system 3 to read music information (step S701). Specifically, the host CPU 21 transmits a read request specifying a logical address to the memory system 3 via the memory I/F 24.

The memory controller 30 transmits the read music information to the host 2 in response to the read request of the music information from the host 2 (step S702). Specifically, upon receiving the read request specifying the logical address via the host I/F 31, the control unit 32 uses an address conversion table to convert the logical address specified by the read request into a physical address, and instructs the NAND I/F 33 to read the converted physical address. The control unit 32 reads the music information from the NAND memory 40 via the NAND I/F 33 and temporarily stores the read music information in the data buffer 34. Then, the control unit 32 transmits the read data to the host 2 via the host I/F 31.

The music information detection unit 36 determines whether there is the read request of the music information from the host 2, and transmits a music information detection notification to the control unit 32 and the high-quality mode maintenance determination unit 37 (step S703). Specifically, the music information detection unit 36 periodically accesses the data buffer 34 to determine whether the music information is stored in the data buffer 34. When there is the read request of the music information from the host 2, the music information is temporarily stored in the data buffer 34. Therefore, the music information detection unit 36 can determine that the read request of the music information is made from the host 2. The music information detection unit 36 acquires reproduction time of the music information from the data buffer 34. Then, the music information detection unit 36 transmits the music information detection notification including the reproduction time of the music information to the control unit 32 and the high-quality mode maintenance determination unit 37.

Upon receiving the music information detection notification, the control unit 32 changes the mode of the memory system 3 to a high-quality mode (step S704). Specifically, upon receiving the music information detection notification from the music information detection unit 36, the control unit 32 changes mode information stored in the management information or the like to the high-quality mode, and controls the NAND I/F 33 in the high-quality mode.

The high-quality mode maintenance determination unit 37 indirectly determines whether the host 2 reproduces the music information (step S705). Specifically, the high-quality mode maintenance determination unit 37 periodically determines whether the high-quality mode should be maintained. Upon receiving the music information detection notification from the music information detection unit 36, the high-quality mode maintenance determination unit 37 starts counting time. When the high-quality mode maintenance determination unit 37 determines that the counted time is less than the reproduction time of the music information, it determines that the high-quality mode should be maintained.

The high-quality mode maintenance determination unit 37 determines that the host 2 reproduces the music during the reproduction time of the music information.

The high-quality mode maintenance determination unit 37 requests the control unit 32 to cancel the high-quality mode when the music reproduction ends (step S706). Specifically, when the high-quality mode maintenance determination unit 37 determines that the counted time exceeds the reproduction time of the music, it requests the control unit 32 to cancel the high-quality mode.

The control unit 32 changes the mode of the memory system 3 to a normal mode in response to the request for cancellation of the high-quality mode from the high-quality mode maintenance determination unit 37 (step S707). Specifically, upon receiving a command of requesting the cancellation of the high-quality mode, the control unit 32 changes the mode information stored in the management information or the like to the normal mode, and controls the NAND I/F 33 in the normal mode.

As described above, according to the second embodiment, the control unit 32 receives a request to change the mode of the NAND I/F 33 from the music information detection unit 36 and the high-quality mode maintenance determination unit 37. Therefore, the host 2 is not required to transmit, to the memory system 3, a command of requesting the memory system 3 to transition to the high-quality mode and a command of requesting the memory system 3 to cancel the high-quality mode.

Meanwhile, in the second embodiment, the host 2 may transmit a command of requesting the cancellation of the high-quality mode, and the memory system 3 may receive the command of requesting the cancellation of high-quality mode. For example, in the case where the host 2 stops reproducing the music, when the memory system 3 does not receive the command of requesting the cancellation of the high-quality mode from the host 2, the same does not cancel the high-quality mode until the reproduction time of the music information elapses. However, when the memory system 3 receives the command of requesting the cancellation of the high-quality mode from the host 2, the memory system 3 can return from the high-quality mode to the normal mode without waiting for the lapse of the reproduction time of the music information.

Further, in the second embodiment, the memory system 3 may reduce the possibility of propagation of noise generated in the host 2 by transitioning to a sleep mode. Mode transition of the memory system 3 will be described below. The host 2 requests the memory system 3 to read music information. The memory system 3 transmits the music information to the host 2. The music information detection unit 36 transmits a music information detection notification to the control unit 32 and the high-quality mode maintenance determination unit 37. Upon receiving the music information detection notification, the control unit 32 changes the mode of the memory system 3 to the sleep mode. Upon receiving the music information detection notification from the music information detection unit 36, the high-quality mode maintenance determination unit 37 starts counting time. The high-quality mode maintenance determination unit 37 periodically determines whether the sleep mode should be maintained. When the counted time exceeds the reproduction time of the music information, the control unit 32 is requested to cancel the sleep mode. The control unit 32 causes the memory system 3 to transition to the normal power mode. By performing the mode transition as described above, the memory system 3 can transition to the sleep mode during the music reproduction, thereby making it possible to reduce power consumption.

Here, the present disclosure is not limited to the above-described embodiments, and of course various modifications can be made without departing from the gist of the present disclosure.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory system connectable to a host, the memory system comprising:
    a nonvolatile memory;
    a first signal line connected to the nonvolatile memory; and
    a memory controller connected to the first signal line and configured to repeatedly perform de-assertion and assertion of the first signal line at a first frequency while transmitting or receiving data to or from the nonvolatile memory,
    wherein the memory controller, in response to receiving a first command from the host, repeatedly performs the de-assertion and the assertion of the first signal line at a second frequency lower than the first frequency while transmitting or receiving the data to or from the nonvolatile memory.

2. The memory system according to claim 1, further comprising:
    a second signal line connected to the nonvolatile memory and the memory controller, the second signal line being different from the first signal line,
    wherein the nonvolatile memory repeatedly performs de-assertion and assertion of the second signal line in conjunction with the de-assertion and the assertion of the first signal line repeatedly performed by the memory controller while transmitting the data to the memory controller.

3. The memory system according to claim 1, wherein the memory controller operates in one of a plurality of modes including a normal mode during which the memory controller repeatedly performs the de-assertion and the assertion of the first signal line at the first frequency and a high-quality mode during which the memory controller repeatedly performs the de-assertion and the assertion of the first signal line at the second frequency.

4. The memory system according to claim 3, wherein the plurality of modes further includes a sleep mode, which is a low power consumption mode during which the memory controller consumes less power than during the normal mode and during the high-quality mode.

5. The memory system according to claim 1, wherein sound data is transmitted from the nonvolatile memory to the memory controller at the second frequency.

6. The memory system according to claim 1, wherein the memory controller is configured to, in response to receiving a second command, repeatedly perform de-assertion and assertion of the first signal line at the first frequency while transmitting or receiving data to or from the nonvolatile memory.

7. The memory system according to claim 6, wherein the first command is a command to decrease a data transfer frequency between the memory controller and the nonvolatile memory and the second command is a command to increase the data transfer frequency between the memory controller and the nonvolatile memory.

8. A memory system comprising:
    a nonvolatile memory;
    a first signal line connected to the nonvolatile memory; and
    a memory controller connected to the first signal line and configured to repeatedly perform de-assertion and assertion of the first signal line at a first frequency while transmitting or receiving data to or from the nonvolatile memory,
    wherein the memory controller includes:
        a control unit;
        a data buffer in which data read from the nonvolatile memory are temporarily stored; and
        a detection unit configured to detect sound data in the data stored in the data buffer,
    wherein the detection unit transmits a first command to the control unit upon detecting the sound data in the data stored in the data buffer, and
    wherein the control unit, in response to receiving the first command from the detection unit, repeatedly performs the de-assertion and the assertion of the first signal line at a second frequency lower than the first frequency while transmitting or receiving the data to or from the nonvolatile memory.

9. The memory system according to claim 8, wherein the detection unit periodically accesses the data buffer to examine the data stored in the data buffer for the sound data.

10. The memory system according to claim 8, further comprising:
    a determination unit to which the detection unit also transmits the first command,
    wherein the determination unit starts counting time upon receipt of the first command and transmits a second command to the control unit when the counted time exceeds a time period for reproducing the sound data.

11. The memory system according to claim 10, wherein the detection unit is configured to determine the time period for reproducing the sound data from the data stored in the data buffer and include the time period for reproducing the sound data in the first command.

12. The memory system according to claim 10, wherein the controller is configured to, in response to receiving the second command, repeatedly perform de-assertion and assertion of the first signal line at the first frequency while transmitting or receiving data to or from the nonvolatile memory.

13. The memory system according to claim 12, wherein the controller is configured to, in response to receiving a third command from a host, repeatedly perform de-assertion and assertion of the first signal line at the first frequency while transmitting or receiving data to or from the nonvolatile memory.

14. The memory system according to claim 8, wherein
    the control unit, in response to receiving the first command from the detection unit, transitions to the sleep mode, and
    the control unit in the sleep mode repeatedly performs the de-assertion and the assertion of the first signal line at the second frequency while transmitting or receiving the data to or from the nonvolatile memory.

15. An information processing system comprising:
a memory system including a nonvolatile memory, a signal line connected to the nonvolatile memory, and a memory controller configured to control the nonvolatile memory; and
a host including a memory interface and a CPU configured to control the memory system via the memory interface,
wherein the memory controller is connected to the signal line, and repeatedly performs de-assertion and assertion of the signal line at a first frequency while transmitting or receiving data to or from the nonvolatile memory, and
wherein the memory controller, in response to receiving a first command from the host, repeatedly performs the de-assertion and the assertion of the signal line at a second frequency lower than the first frequency while transmitting or receiving the data to or from the nonvolatile memory.

16. The information processing system according to claim 15, wherein the host further includes a sound interface configured to D/A convert audio data read from the memory system.

17. The information processing system according to claim 16, wherein the audio data read from the memory system is transmitted from the nonvolatile memory to the memory controller at the second frequency and stored temporarily in the memory controller before being transmitted from the memory controller to the host.

18. The information processing system according to claim 17, wherein the memory controller operates in one of a plurality of modes including a normal mode during which the memory controller repeatedly performs the de-assertion and the assertion of the first signal line at the first frequency and a high-quality mode during which the memory controller repeatedly performs the de-assertion and the assertion of the first signal line at the second frequency.

19. The information processing system according to claim 18, wherein the plurality of modes further includes a sleep mode, which is a low power consumption mode during which the memory controller consumes less power than during the normal mode and during the high-quality mode.

20. The information processing system according to claim 15, wherein the memory controller is configured to, in response to receiving a second command, repeatedly perform de-assertion and assertion of the first signal line at the first frequency while transmitting or receiving data to or from the nonvolatile memory.

* * * * *